May 3, 1960   W. S. SUTOWSKI   2,935,357
WHEEL HAVING NYLON RIM AND METHOD OF MAKING SAME
Filed June 18, 1956

INVENTOR.
WALTER S. SUTOWSKI
BY

2,935,357

WHEEL HAVING NYLON RIM AND METHOD OF MAKING SAME

Walter S. Sutowski, Brecksville, Ohio

Application June 18, 1956, Serial No. 592,011

9 Claims. (Cl. 301—5)

My invention relates to wheels such as used in conveyors and other apparatus and to the method for making the same.

An object of my invention is to provide a unique construction of a wheel and the like having an outer peripheral portion of nylon and having a ball bearing unit mounted within the nylon part.

Another object is the provision for mounting a bearing unit having an inner and outer race within the central aperture of a wheel having a rim and web composed of integral nylon.

Another object is the provision for mounting within the central aperture of a nylon wheel a bearing unit having a maximum circumference greater than the circumference of the central opening in the wheel.

Another object is the provision of a construction for taking advantage of the unique characteristics of nylon not only in the assembled wheel but also in the fabrication of the wheel.

Another object is the provision of a wheel having a bearing unit which has a split outer race and which is positioned within the central opening of a nylon wheel, the central opening having a diameter smaller than the maximum diameter of the split outer race in its compressed condition.

Another object is the provision of a unique method for fabricating wheels having a nylon part and a bearing unit mounted within the nylon part.

Another object is the provision of a method for mounting a bearing unit having a split outer race within the central opening in a body of nylon composing the rim and web of the wheel.

Other objects and a fuller understanding of my invention may be had by referring to the following description and claims, taken in conjunction with the accompanying drawing, in which:

Figure 1:
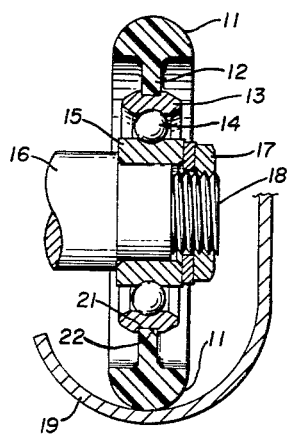
Figure 1 is a cross-sectional view of a wheel made in accordance with my invention and taken along the line 1—1 of Figure 2.

In Figure 1 the wheel is shown as running in the channel of a trackway, typifying one of its intended uses. For purposes of clarity, this channel-shaped trackway has not been shown in Figure 2.

Figure 3:
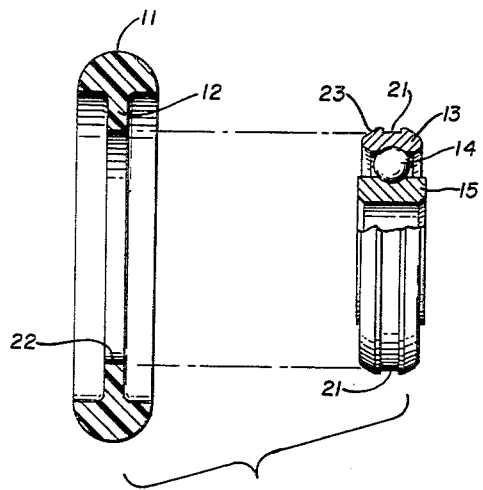
Figure 4:
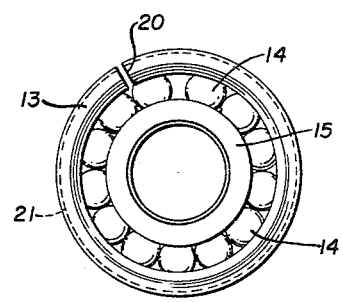

Figure 3 is an exploded view showing the rim and web of nylon of my wheel and separated therefrom the bearing unit prior to the assembly of the bearing unit within the central opening in the nylon part of the wheel; and Figure 4 is a side elevational view of the bearing unit used in my wheel and showing it prior to its insertion within the central opening in the nylon part of the wheel.

My wheel has an annular member made up of a rim portion 11 and a web portion 12, the portions 11 and 12 being formed of one integral piece of nylon. As seen in the drawing, the rim portion 11 is relatively thick in an axial direction, whereas the web portion 12 is relatively thin in an axial direction. The web portion 12 extends radially inward a substantial distance from the thicker rim portion 11.

By reason of the relatively thin section of the web portion 12 and its considerable radially inward extension, together with the resilient yieldability inherent in nylon, the inner radial edge portion, denoted by the reference character 22, of the web portion 12 may yieldably flex in an axial direction upon the application of sufficient force in an axial direction upon this inner radial edge portion 22. The web portion, however, is sufficiently stiff so as to withstand ordinary minimal axial thrust in the ordinary and usual use of my wheel. Also the relative dimensions of the web portion 12 and rim portion 11 and the inherent nature of the nylon are such that radial thrust is readily withstood by the web portion 12 and rim portion 11.

Figure 2:
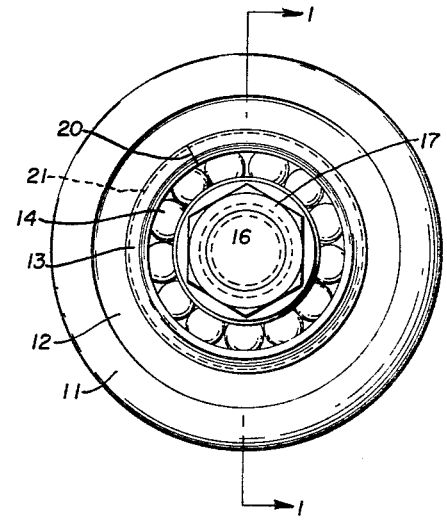
Figure 2 is a side elevational view of the wheel embodying my invention.

A bearing unit is positioned within the central axial opening provided in the nylon parts 11 and 12 of my wheel. This bearing unit is composed of an inner steel race 15 and an outer steel race 13 between which are disposed in the usual manner a plurality of steel balls 14 which are arranged in a circle and which move to provide a bearing engagement between the inner and outer races. The outer race 13 is split at the split or gap 20. When in the compressed condition of the outer race, the split 20 is closed so that there is a substantially continuous path for the balls 14 provided by the outer race 13. The outer race is resiliently yieldable to permit the insertion of the balls between the races. The outer race 13 is resiliently biased to be slightly expanded to provide a gap at the split 20 when in an uncompressed condition, for example, as shown in Figure 4. When in the compressed condition, the outer race 13 closes the split 20 as illustrated in Figure 2.

Mounted within the inner race 15 is a shaft 16. A nut 17 is threadably secured to the threaded outer end 18 of the shaft 16 so as to secure the inner race 15 to the shaft 16 in such manner that the inner race 15 is nonrotatably secured to the shaft 16.

The outer race 13 has an annular groove 21 formed in its outer circumferential wall. As seen in the drawing, this groove 21 is channel-shaped and has a bottom wall and two end walls axially spaced from each other. When the outer race of the bearing unit is in its expanded condition, as shown in Figure 4, it has a maximum circumference that is too large to fit within the central opening of the nylon web defined by the inner edge portion 22 of the nylon web. Also, when the outer race 13 is in its compressed condition, such as illustrated in Figure 2, its maximum circumference, that is, its circumference on each side of the channel 21, is also greater than the internal circumference of the central opening within the web 12, as defined by the surrounding wall of the inner edge portion 22. To position the bearing unit within the central opening of the nylon wheel so as to have the position shown in Figures 1 and 2, the outer race is compressed to close the split 20 and also the bearing unit is forcibly moved against the edge portion 22 of the web portion 12, while moving the bearing unit and the nylon wheel toward each other in an axial alignment. In other words, the disassembled parts shown in Figure 3 are moved toward each other while in axial alignment to the assembled position shown in Figure 1.

The sloping sides 23 of the outer race 13 sloping outwardly from the channel 21 provide a camming surface for the interengagement of the outer race and the inner edge portion 22 of the nylon part. By using sufficient force to move the bearing unit to within the nylon part of the wheel, the camming action provided by the sloping sides 23 and the resilient yieldability, as previously described, of the inner edge portion 22 of the web portion 12, provide that the web portion 12 sufficiently yields under the applied force to permit the bearing unit to be forced within the aperture of the nylon part so as to assume the position shown in Figure 1. Here the web portion 12 has resiliently resumed its normal position after momentarily flexing and the inner radial edge portion 22 is now positioned within the groove 21 of the outer race. The interaction of the web portion 12 and the inner edge portion 22 thereof with the walls of the groove is such as to firmly retain in compressed condition the outer race 13 so as to hold it in the position shown in Figure 2 and at the same time, the bearing unit is held against axial displacement relative to the nylon web and rim.

A novel and useful construction is provided by the novel and simple method herein disclosed. Because one of the several uses of such a wheel made in accordance with my invention may be its use as a conveyor wheel running in a trackway, I have illustrated such a trackway in Figure 1. Here the trackway, denoted by the reference character 19, forms a channel along which the wheel assembly may travel in a conveyor system.

The present disclosure includes that contained in the appended claims, as well as that of the foregoing description.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and scope of the invention as hereinafter claimed.

What is claimed is:

1. A bearing device comprising the combination of an annular member of integrally formed nylon, said annular member having a rim portion and a web portion extending radially inward of said rim portion intermediate the axial ends thereof a radial distance to define a round central opening in said annular member, said rim portion having a first axially extending dimension and said web portion having a second axially extending dimension, said second axially extending dimension being substantially less than said first axially extending dimension, the said radial distance that said web portion extends inward from the rim portion, the said second axially extending dimension of the web portion, and the resiliently yieldable nature of the nylon being such that the web portion at its radially inward edge portion may flex in an axial direction, and a bearing unit having a split outer race resiliently biased to have a maximum outer circumference in uncompressed condition and a minimum outer circumference in compressed condition, said outer race having a circumferentially extending groove extending therearound, said groove having radially disposed end walls spaced axially apart a distance corresponding to said second axially extending dimension of said web portion to provide for the complementary reception of said web portion between the end walls of said groove, the bottom wall of said groove of the outer race in its compressed condition having a circumference corresponding to the circumference of said round central opening to provide for the complementary interengagement of said web portion and said bottom wall, the said web portion being positioned in said groove by the axially directed flexing of said web portion and the compressing of said outer race, and said outer race being maintained in compressed condition by the restraint of the web portion on the bottom wall of said groove.

2. A bearing device comprising in combination an annular member of integrally formed nylon, said annular member having a rim portion and a relatively thin web portion extending radially inward intermediate the axial ends of the rim portion, said annular member having a central round opening axially extending therethrough, a metal bearing unit having a split outer race, said outer race having a groove in its outer circumferential wall intermediate its axial ends and extending circumferentially of the outer race, said race in the transverse plane of said groove having a diameter less than the diameter of the race in the transverse planes of the race on opposite axial sides of the groove, the said web portion having an inner radial edge portion disposed within said groove to engage the bottom wall and spaced side walls of the groove, the interengagement of the bottom wall by the said edge portion compressing said outer race and the interengagement of spaced side walls by the said edge portion maintaining the axial position of the outer race relative to the annular member, said edge portion being positioned in said groove by the flexing in an axial direction of said web portion relative to said rim portion upon pressing the bearing unit into said central round opening.

3. The combination of a nylon wheel and a bearing member, said bearing member having an annular groove formed in its outer circumferential wall, said nylon wheel having a rim portion and a web portion, said web portion being disposed in said groove around the bottom wall thereof and intermediate the axially spaced walls thereof, said web portion being thinner in an axial direction than said rim portion and extending radially inward from said rim portion such a distance that the yieldability of the nylon provides for the yielding of the web portion in an axial direction upon pressing of the bearing member axially against the nylon wheel and the movement of the web portion radially into said groove.

4. The combination of a bearing unit having a split resilient outer race biased to expand in uncompressed condition, said outer race having a circumferentially extending groove in its outer circumferential wall, and a wheel member made of integrally formed nylon, the wheel member having a rim portion and a web portion, said web portion being thinner in an axial direction than said rim portion and being relatively yieldable in an axial direction as it extends radially inward from the rim portion, said web portion having a round central opening having a circumference complementarily corresponding to the circumference of the said outer race in the transverse plane of the outer race through said groove in the compressed condition of the outer race, the said circumference of the round central opening being less than the circumference of the said outer race in transverse planes through the outer race on opposite axial sides of said groove in the compressed condition of the outer race, the said web portion having around said central opening an inner radial edge portion disposed in the groove in said split outer race and to hold the outer race against axial displacement relative to the wheel member, the yieldability of said web portion providing for the deflection of the web portion upon axial movement of the bearing unit and wheel member together to permit the said edge portion to enter said groove.

5. The method of making a wheel having a bearing unit positioned therein comprising providing a wheel member of integrally formed nylon and having a relatively yieldable web portion within a relatively non-yieldable rim portion surrounding the web portion and having a central opening axially extending therethrough; providing a bearing unit having a split resilient outer race, the outer race being formed with a circumferentially extending groove in its outer circumferential wall, the diameter of the outer race in the plane of the groove in the compressed condition of the outer race complementarily corresponding to the diameter of said central opening to interfit therewith, the diameter of the outer race axially spaced from the groove and in the compressed condition of the outer race being greater than the diameter of said central opening; and compressing said outer race and concurrently moving said bearing unit and wheel member together in an axial direction to flex said web portion and engage said web portion in said groove.

6. The method of making wheels of nylon rim and web portions and a bearing unit centrally positioned therein, the web portion being yieldable in an axial direction about a central opening in the web portion and the bearing unit having a circumferentially extending groove in its outer wall; comprising the steps of axially aligning said bearing unit with said central opening; pressing said unit into said central opening to flex the said web portion; and aligning said groove in the plane of said web portion to permit the web portion to extend radially inward into said groove.

7. An antifriction roller assembly comprising a plastic tire having a radially inwardly projecting narrow web, an antifriction metal bearing assembly having a split outer race ring with a peripheral groove snugly receiving said web, said outer race ring being contractible and said web being axially deflectible to cooperate with the ring in accommodating insertion of the web in the ring groove under axially applied load, and the inner peripheral diameter of the web being proportioned relative to the depth of said groove to radially load the split outer race ring into a contracted condition without permanently deforming the web.

8. In a roller assembly, a one-piece plastic tire having a resiliently deflectible web flange member defining a central annular aperture in said tire, an annular metallic hub bearing member, the minimum inner diameter of said tire aperture when said web is in its normal undeflected position being less than the maximum outer diameter of said metallic hub member, said web being deflectible to a deformed position in which said inner diameter of said aperture is at least equal to said maximum outer diameter of said hub member to permit insertion of said hub member in said tire aperture, said tire being snap-seated on said hub by contraction of said web from said deformed position to said normal undeflected position, said hub member and said web member each being shaped to provide mating surfaces which coact to prevent unseating of said snap-seated tire member from said hub member.

9. An antifriction roller assembly comprising a one-piece plastic tire having a radially inwardly projecting narrow web member, said web member defining a central annular aperture in said tire, said web member being resiliently axially deflectible, an antifriction metallic bearing assembly having a split outer race ring with an annular peripheral groove on the outer surface of said ring, the minimum inner diameter of said tire aperture when said web is in its normal undeflected position being less than the maximum outer diameter of said metallic hub member but at least equal to the diameter of the bottom of said groove, said outer race ring being contractible to cooperate with said deflectible web to accommodate insertion of the web in the ring groove under axially applied load to snap-seat said tire on said bearing assembly by contraction of said web from an axially deflected position in which said inner diameter of said tire aperture is at least equal to said maximum outer diameter of said outer race ring to said normal undeflected position by seating of said web in said groove, and the shape and inner peripheral diameter of the web being proportioned relative to the shape and depth of said groove to radially load the ring into a contracted condition without permanently deforming the web and to prevent unseating of said snap-seated tire member from said hub member under axial load.

References Cited in the file of this patent

UNITED STATES PATENTS 2,625,449   Sutowski _____ Jan. 13, 1953

FOREIGN PATENTS 1,092,766   France _____ Nov. 10, 1954